United States Patent
Lee et al.

(10) Patent No.: US 7,080,156 B2
(45) Date of Patent: Jul. 18, 2006

(54) MESSAGE ROUTING IN A TORUS INTERCONNECT

(75) Inventors: Whay S. Lee, Newark, CA (US); Nisha Talagala, Fremont, CA (US); Fay Chong, Jr., Cupertino, CA (US); Chia Y. Wu, Newark, CA (US); Randall D. Rettberg, Concord, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 793 days.

(21) Appl. No.: 10/104,923

(22) Filed: Mar. 21, 2002

(65) Prior Publication Data

US 2003/0191855 A1    Oct. 9, 2003

(51) Int. Cl.
G06F 15/173 (2006.01)

(52) U.S. Cl. .................. 709/238; 709/239; 370/401; 370/406

(58) Field of Classification Search ............... 709/238, 709/239; 370/351, 401, 409, 911, 406
See application file for complete search history.

(56) References Cited

U.S. PATENT DOCUMENTS

| | | | | |
|---|---|---|---|---|
| 4,933,933 A * | 6/1990 | Dally et al. | ................ | 370/406 |
| 5,701,416 A | 12/1997 | Thorson et al. | | |
| 5,915,097 A * | 6/1999 | Chao | ...................... | 709/238 |
| 6,272,548 B1 | 8/2001 | Cotter et al. | | |
| 6,314,487 B1 | 11/2001 | Hahn et al. | | |
| 6,370,585 B1 * | 4/2002 | Hagersten et al. | .......... | 709/238 |
| 6,631,136 B1 * | 10/2003 | Chowdhury et al. | ... | 370/395.31 |
| 2005/0076137 A1 * | 4/2005 | Tang et al. | ................ | 709/238 |

OTHER PUBLICATIONS

Tzi-Cker Chiueh, "Trail: A Track-based Logging Disk Architecture for Very Fast Writes", Experimental Computer Systems Laboratory, Computer Science Department, State University of New York, Stony Brook, NY, Mar. 10, 1994, pp. 1-22.

Yiming Hu and Qing Yang, "DCD—Disk Caching Disk: A New Approach for Boosting I/O Performance", ACM, Dept. of Electrical & Computer Engineering, University of Rhode Island, Kingston, RI, 1996, pp. 169-178.

(Continued)

*Primary Examiner*—Kamini Shah
(74) *Attorney, Agent, or Firm*—Meyertons Hood Kivlin Kowert & Goetzel, P.C.; B. Noël Kivlin (57) ABSTRACT

Systems and methods for routing messages in an interconnection fabric are provided. The fabric includes a plurality of nodes, each node having, for example, four ports coupled to adjacent nodes in the fabric. A source node initiating a message in the fabric can transmit the message out of one of its four ports. Between a source node and a destination node, there are at least four independent paths which may be taken, depending on the output port from the source node. However, the precise path is not expressly delineated in the message. Instead, the message contains the address of the destination node, the address of the originating node, and a target region for the message. Each intermediate node is configured to receive a message via one of its four ports, and then select an appropriate output port based on the location of the port which received the message combined with the address and target information contained in the message. By providing a system by which four independent paths can be taken by a message, at least three intermediate nodes can fail in the fabric before the message is prevented from reaching the destination node.

21 Claims, 5 Drawing Sheets

OTHER PUBLICATIONS

May Baker, Satoshi Asami, Etienne Deprit, John Ousterhout, and Margo Seltzer, "Non-Volatile Memory for Fast, Reliable File Systems", ACM, Computer Science Division, Electrical Engineering and Computer Sciences, University of California, Berkeley, CA 1992, pp. 10-22.

Daniel, Stodolsky, Garth Gibson, and Mark Holland, "Parity Logging Overcoming the Small Write Problem in Redundant Disk Arrays", IEEE, School of Computer Science and Department of Electrical and Computer Engineering, Carnegie Mellon University, Pittsburg, PA, 1993, pp. 64-75.

* cited by examiner

MESSAGE ROUTING IN A TORUS INTERCONNECT

BACKGROUND OF THE INVENTION

Data communication between components of a computer system can be provided in a number of ways. In many large storage systems, for example, the interconnection solutions may be based on bus architectures such as the small computer system interconnect (SCSI) or fibre channel (FC) standards. In these architectures, multiple storage devices such as hard disk drives may share a single set of wires or a loop of wires for data transfers.

Such architectures may be limited in terms of performance and fault tolerance. Since all of the devices share a common set of wires, only one data transfer may take place at any given time, regardless of whether the devices have data ready for transfer. Also, if a storage device fails, it may be possible for that device to render the remaining devices inaccessible by corrupting the bus. Additionally, in systems that use a single controller on each bus, a controller failure may leave all of the devices on its bus inaccessible. In a large storage array, component failures can occur with significant frequency. As the number of components in a system is increased, the probability that any one component will fail at any given time increases, and, accordingly, the mean time between failures (MTBF) for the system is decreased.

It may be desirable to minimize the effect of errors on data transmission between components and to improve performance by routing messages over an interconnection fabric. Multi-path interconnection fabrics can provide failover capabilities to networks. In an interconnection fabric including a network of nodes, multiple independent paths between any two nodes in the network can be possible. After a message is initiated by a source node, the message may pass through multiple intermediate nodes before ultimately reaching the destination node.

Various methods are known for controlling the path which the message follows to reach the destination node. According to some methods, the entire path is predetermined by the source node and is stored in the message. Each intermediate node need only follow the routing instructions provided in the message. This type of routing method can have several disadvantages. First, this method typically requires that the source node have a detailed understanding of the network topology, as well as the network's current loads and conditions. Even with such an understanding of the network, this type of routing method may be ineffective at adapting to failures or delays which occur in the predetermined path after the message has been transmitted from the source node. In addition, storing the detailed routing instructions within the message may cause the size of the message to increase to an undesirable level.

According to various adaptive routing schemes, each message contains the destination address, but no detailed routing instructions. At each intermediate node encountered by the message along its route, the destination address is read and this information is used by the intermediate node to compute the optimum path for onward transmission. Therefore, when a message is injected into the network, each intermediate node selects the next node to which to transmit the message, taking into account node failures, congestion and other conditions. This type of intelligent routing may be useful in some situations, but typically requires that each intermediate node be provided with the capability to monitor the node conditions and make appropriate decisions in response thereto. This can dramatically increase the cost of the system, particularly when a large number of nodes are utilized. In addition, because a message is typically processed by multiple nodes with each node making a determination as to the optimum path, a message between a particular source and destination node may take a different path every time it is injected. In some situations, it may be desirable to have a more predictable routing methodology.

BRIEF SUMMARY OF THE INVENTION

In accordance with embodiments of the present invention, a computer-implemented method of routing a message in an interconnection fabric including a plurality of nodes, each node having a plurality of ports, is provided. The method comprises: receiving a message at a first node via a receiving port provided in the first node, wherein the first node has a first node address and the message includes an originating address for the message, a destination address for the message, and a target region for the destination address. If the first node address does not correspond to the destination address, then the method further comprises determining an output port from the plurality of ports provided in the first node based on the originating address, the destination address, the first node address, the target region, and the receiving port of the first node; and transmitting the message to a second node coupled to the determined output port.

In accordance with further embodiments of the present invention, a node for routing a message in an interconnection fabric configured for use in connection with a processor-based system is provided. The node comprises: a plurality of ports for receiving and transmitting messages, each message including an originating address for the message, destination address for the message, and a target region for the destination address; a routing module for determining an output port from the plurality of ports based on the originating address, the destination address, an address of the node, the target region, and the location of the port receiving the message, and for transmitting the message out of the output port.

In accordance with further embodiments of the present invention, a computer system is provided. The computer system comprises an interconnection fabric which includes a plurality of nodes and a plurality of node interconnects. Each node comprises a plurality of ports for receiving and transmitting messages, each message including an originating address for the message, destination address for the message, and a target region for the destination address; and a routing module for determining an output port from the plurality of ports based on the originating address, the destination address, an address of the node, the target region, and the location of the port receiving the message, and for transmitting the message out of the output port. Each node interconnect couples one of the plurality of ports in one of the plurality of nodes to one of the plurality of ports in a different one of the plurality of nodes.

In accordance with further embodiments of the present invention, an article of manufacture is provided. The article of manufacture includes code for routing a message in an interconnection fabric including a plurality of nodes, each node having a plurality of ports. The code causes operations to be performed comprising: receiving a message at a first node via a receiving port provided in the first node, wherein the first node has a first node address and the message includes an originating address for the message, a destination address for the message, and a target region for the destination address. If the first node address does not correspond to the destination address, then: determining an output port from the plurality of ports provided in the first node based on the originating address, the destination address, the first node address, the target region, and the receiving port of the first node; and transmitting the message to a second node coupled to the determined output port.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Some portions of the detailed description which follows are presented in terms of procedures, steps, logic blocks, processing, and other symbolic representations of operations on data bits that can be performed on computer memory. A procedure, computer-executed step, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, or combinations of the two.

In accordance with some embodiments of the present invention, systems and methods for routing messages in a torus interconnection fabric are provided. The fabric includes a plurality of nodes, each node having, for example, four ports coupled to adjacent nodes in the fabric. A source node initiating a message in the fabric can transmit the message out of one of its four ports. Between a source node and a destination node, there are at least four independent paths which may be taken, depending on the output port from the source node. However, the precise path is not expressly delineated in the message. Instead, the message contains the address of the destination node, the address of the originating node, and a target region for the message. Each intermediate node is configured to receive a message via one of its four ports, and then select an appropriate output port based on the location of the port which received the message combined with the address and target information contained in the message. By providing a system by which four independent paths can be taken by a message, at least three intermediate nodes can fail in the fabric before the message is prevented from reaching the destination node.

According to one methodology for these embodiments, a message transmitted from a particular port in a source node will always travel along the same path to reach a particular destination node. In the event that the message cannot reach the destination node via that path, the source node can retransmit the message from another port. Because the path taken by a message transmitted from each of the four ports of the source node will always be fully independent of the paths taken when transmitted from the other ports, the source node need not recalculate an entirely new path for the message to take.

Figure 1:
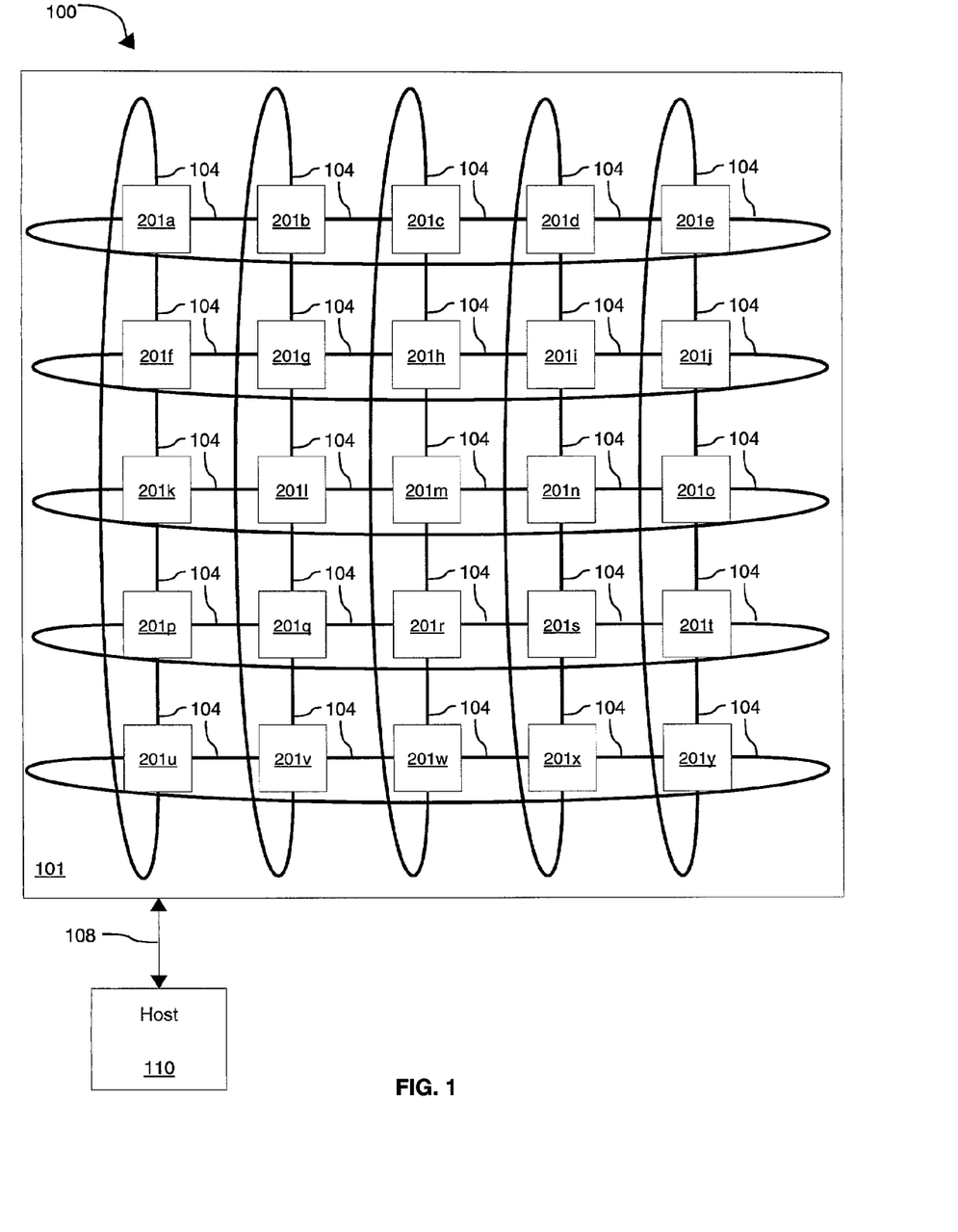
FIG. 1 shows a functional block diagram of a computer system including a 5×5 torus interconnection fabric in accordance with embodiments of the present invention.

FIG. 1 shows a diagram of a torus interconnection fabric 100 having a 5×5 array of nodes 201a–201y in accordance with one embodiment of the present invention. The fabric 100 can be provided as part of a computer system 101. Each node 201 may support one or more different types of components in the computer system. In the illustrated embodiment, computer system 101 is a data storage system, such as one incorporating redundant array of inexpensive disks (RAID) technology, and can connect to a host 110 via a host/storage connection 108. Host/storage connection 108 can be, for example, a local bus, a network connection, another interconnection fabric, or other communication channel. In some embodiments, a plurality of hosts 110 can be in communication with computer system 101 via host/storage connection 108, or a plurality of storage systems 101 can be in communication with one or more hosts 110.

As used herein, computer system refers to any of a variety of computational devices for processing data, such as, for example, mainframes, servers, workstations, desktop computers, laptop computers, hand held computers, storage subsystems, direct attached storage (DAS) systems, network attached storage (NAS) systems, or any combination thereof. Interconnection fabric refers to a mesh of multiple point-to-point interconnects linking a plurality of nodes. In various embodiments, an interconnection fabric can provide multiple simultaneous data communications between the nodes, and may be capable of routing data without arbitration.

In one embodiment, each of the nodes 201a–201y can be configured to support one or more types of components for computer system 101. A first type of node is configured to support a storage controller which provides, for example, RAID processing capability. This first type of node can be provided with the circuitry and memory used to generate and transmit messages to the other nodes 201 in fabric 100, and may be further configured to process and store data from the other nodes 201. A second type of node may be configured with a host interface or line card that may serve as an interface to host/storage connection 108. A third type of node may be configured as a storage node and may be connected to or be provided with one or more storage devices, such as hard disk drives. A fourth type of node may be configured as a storage cache memory node that provides, for example, a storage cache for one or more of the storage nodes. A fifth type of node may be configured as a routing node and merely expands the communication paths available between other nodes. In other embodiments, each of the nodes 201 may support any combination of features and components. Also, other configurations may have a greater or fewer number of nodes 201, and the nodes 201 may be configured and used differently.

As shown in FIG. 1, torus interconnection fabric 100 uses a two-dimensional (2D) array topology with the beginning nodes connected to the endpoint nodes of each row and column. For example, if the 2D array is an M×N array, where M and N are positive integers, then the first node in row 1 (the node in the bottom left corner in FIG. 1) would be connected to the last node in row 1 (the node in the bottom right corner in FIG. 1). Likewise, from a column perspective, the first node in row 1 is also connected to the first node in the top row (the node in the upper left corner in FIG. 1). Each node 201 is configured to transmit data along four point-to-point interconnects 104 to four adjacent nodes 201. Using these interconnects 104, each node 201 may transfer data to and from other nodes 201 in the fabric 100 using multiple communication paths, each path being partially or completely independent of the other paths. To transfer data from a source node 201 in the fabric 100 to a destination node 201, the data may have to travel through multiple interconnects 104 and multiple nodes 201 before reaching the destination node 201.

It is noted that fabric 100 is shown in FIG. 1 as a flat 2D array with longer connections between the endpoints, or "edges" of the array. The illustrated embodiment shows a logical layout of nodes 201 and interconnects 104. However, the physical layout of the devices and structures forming array 100 may be different. For example, each row may be physically oriented in the shape of a ring, such that the distance from the last node to the first node may be approximately equal to the distance between the other nodes.

Figure 2:
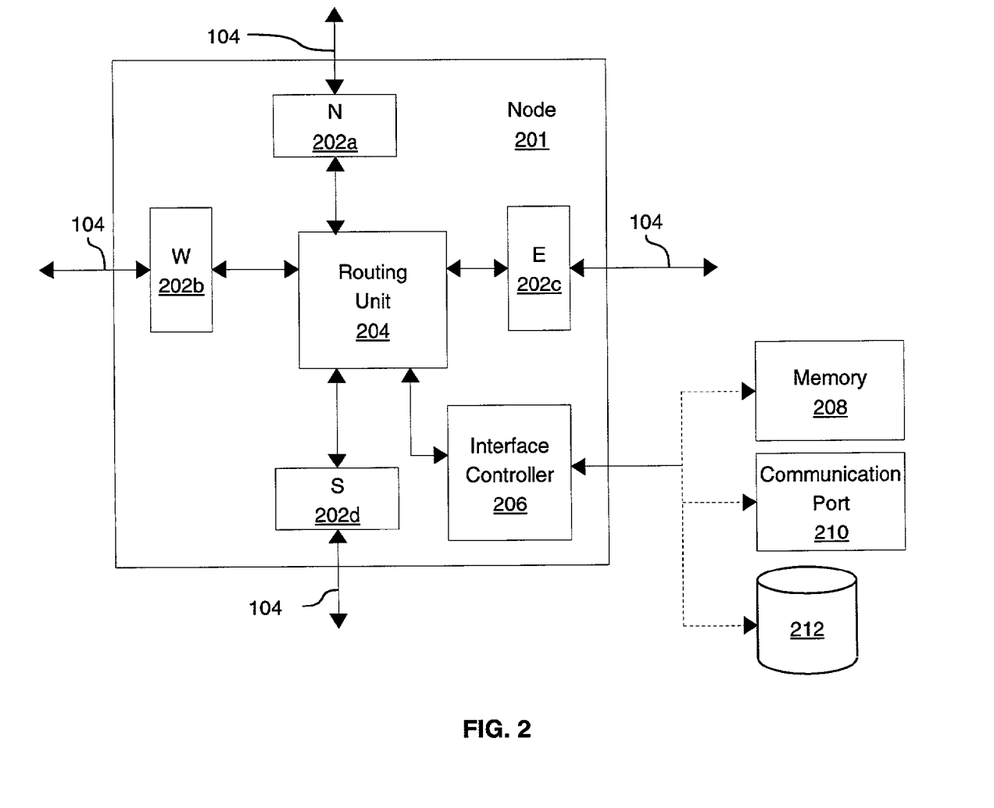
FIG. 2 shows a functional block diagram of a node in accordance with embodiments of the present invention.

FIG. 2 is a functional block diagram showing one embodiment for node 201 in FIG. 1. Node 201 can be configured to operate in any of the five modes, as described above. In the embodiment shown, node 201 includes a routing unit 204 connected to an interface controller 206, which is, in turn, connected to a memory 208. Routing unit 204 is configured to communicate through multiple ports 202a–202d, which are coupled to interconnects 104. In the embodiment shown, there are four bi-directional ports (port N 202a, port W 202b, port E 202c, and port S 202d), so routing unit 204 may communicate with four neighboring nodes using four independent communication paths.

In some embodiments, node 201 comprises a printed circuit board (PCB) containing a chip or chips and circuitry to perform the functions of routing unit 204 and interface controller 206. Computer system 101 may include a PCB main board containing an M×N array of interfaces (e.g., PCB edge connectors) to which each PCB-based node 201 can be connected. This modular approach can enable the system 101 to be reconfigured to include different types of nodes to optimize system 101 for different situations and demands. Each node 201 may be dedicated to one of the various functions described above, or may be configurable to support all of the functions and/or other functions as well. In yet other embodiments, each node can be provided in a portion of the PCB main board of computer system 101.

Interface controller 206 may be configured to communicate with one or more storage devices 212. It is noted that the storage devices 212 may be hard disk drives or any other device for storing data in non-volatile form, such as optical disks, floppy disks, or tape storage. In some embodiments, interface controller 210 may be configured to communicate with a host or a RAID controller through a communication port 210, such as, for example, a peripheral component interface (PCI) bus. In some embodiments, interface controller 206 may be configured to communicate with one or more memories 208, such as a DRAM cache memory or other type of memory or memory controller. Interface controller 210 may be configured to perform all of these functions or any combination of these or other functions. In other embodiments, interface controller 210 may not have any devices attached or may be omitted altogether. In these embodiments, node 201 may simply connect to neighboring nodes through routing unit 204. Thus, node 201 may be used as a routing node to increase the number of possible communication paths available. In other embodiments, one or more storage devices 212, communication ports 210, and memories 208 may be included within node 201.

Figure 3:
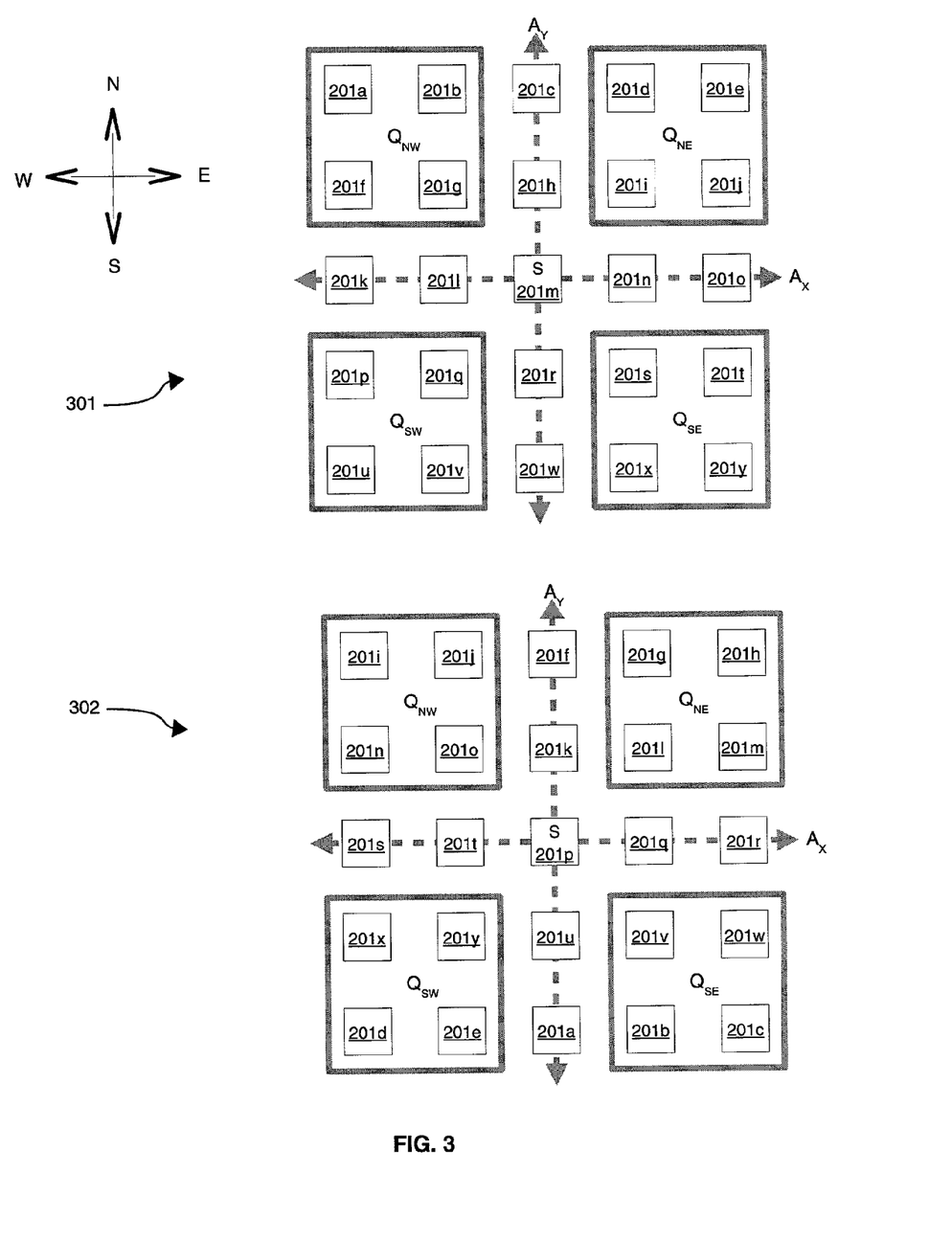
FIG. 3 shows multiple target regions in a torus interconnect fabric in accordance with embodiments of the present invention.

FIG. 3 shows how nodes 201a–201y can be arranged into a plurality of target regions with a source node at the approximate center. For convenience, the relative locations of the nodes are referred to herein using compass directions, north, south, east, and west. Similarly, the ports 202 provided in each node are labeled N, S, E, or W to indicate that the ports are coupled to the nodes directly to the north, south, east, or west, respectively.

In arrangement 301, node 201m is the source node originating the message. A first target region is defined by the nodes along the axis $A_X$ having source node 201m at its approximate center: nodes 201k, 201l, 201n, and 201o. A second target region is defined by the nodes along axis $A_Y$ having source node 201m at its approximate center: nodes 201c, 201h, 201r, and 201w. Axes $A_X$ and $A_Y$ divide the remaining nodes into four quadrants, $Q_{NW}$, $Q_{NE}$, $Q_{SW}$, and $Q_{SE}$. The third through sixth target regions are defined by the nodes contained in each of these four quadrants. For the embodiment shown in FIG. 3, any destination node in fabric 100 will fall into one of the six target regions.

It is noted that the source node need not always be node 201m and that messages may be initiated by any of the nodes 201a–201y in interconnection fabric 100. Because of the wrap-around interconnections in the torus, the nodes in fabric 100 can be represented such that any new source node is located at the center of the array in FIG. 2. Accordingly, the nodes defining each of the six regions will change, depending on which node 201 is the source node. This can be seen in arrangement 302, in which node 201p is the source node initiating the message. As can be seen in FIG. 3, each of the six target regions for source node 201p contains a different set of nodes 201 than the target regions while the source node is node 201m. However, the north, south, east, and west relationships between nodes remains the same. For example, in either arrangement 301 and 302, node 201p always has its port N coupled to node 201k, its port S coupled to node 201u, its port E coupled to 201q, and its port W coupled to node 201t.

It is also not necessary that the fabric be formed by a 5×5 array of nodes 201. In other embodiments, the fabric can be formed of with greater or fewer numbers of nodes or one dimension may be longer than the other. In these embodiments, the source node may not be located at precisely the center of the array, and each of the target regions may include different numbers of nodes. For example, in a 5×6 array, target regions $Q_{NW}$, $Q_{NE}$ may each include six nodes and target region $A_Y$ may include 5 nodes, while target regions $Q_{SW}$, $Q_{SE}$, and $A_X$, will continue to contain four nodes each. Various other arrangements are possible.

Figure 4:
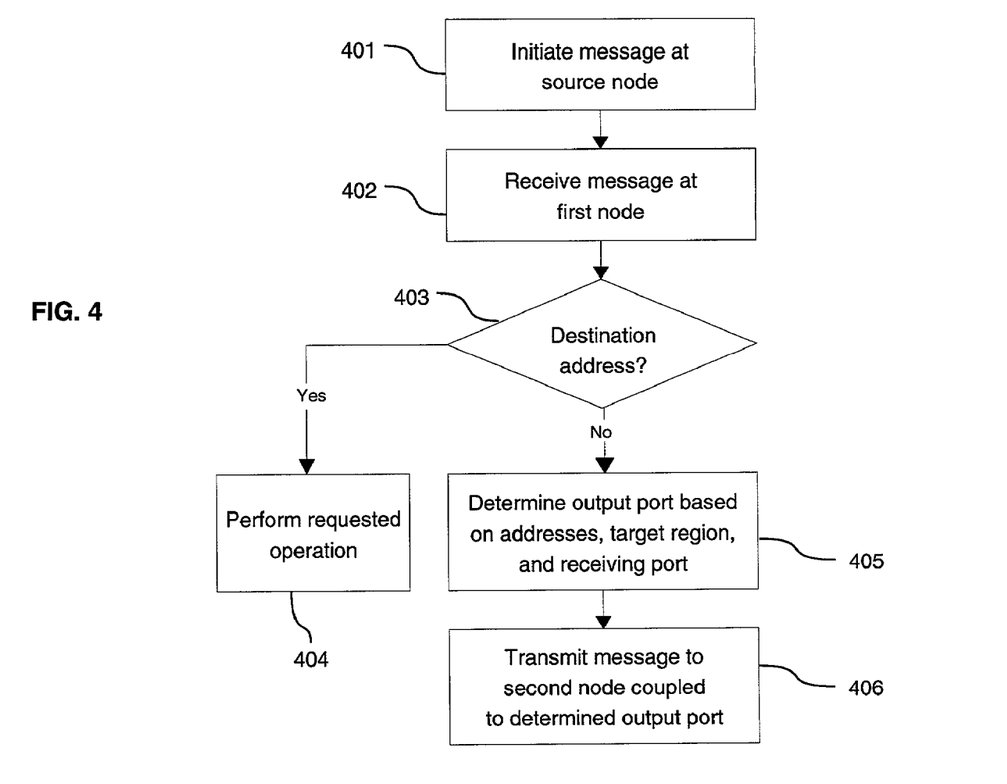
FIGS. 4–5 show flowcharts of methods for routing a message in a torus interconnection fabric in accordance with embodiments of the present invention.

FIG. 4 is a flowchart of a method for routing a message in a torus interconnection fabric in accordance with embodiments of the present invention. In accordance with this method, in step 401, a message is initiated at a source node. Next, in step 402, the message is received at a first node. In step 403, the first node determines whether the destination address for the message is the same as the first node's address. If it is, then in step 404, the first node performs the requested action or operation contained within the message. This requested action or operation can be, for example, an I/O request to store data onto a storage device coupled to the first node. If not, then in step 405, the first node determines the appropriate output port based on the first node address, the destination address, the source address, a target region for the message, and the receiving port of the first node. Finally, in step 406, the message is transmitted to a second node coupled to the determined output port in the first node.

Figure 5:
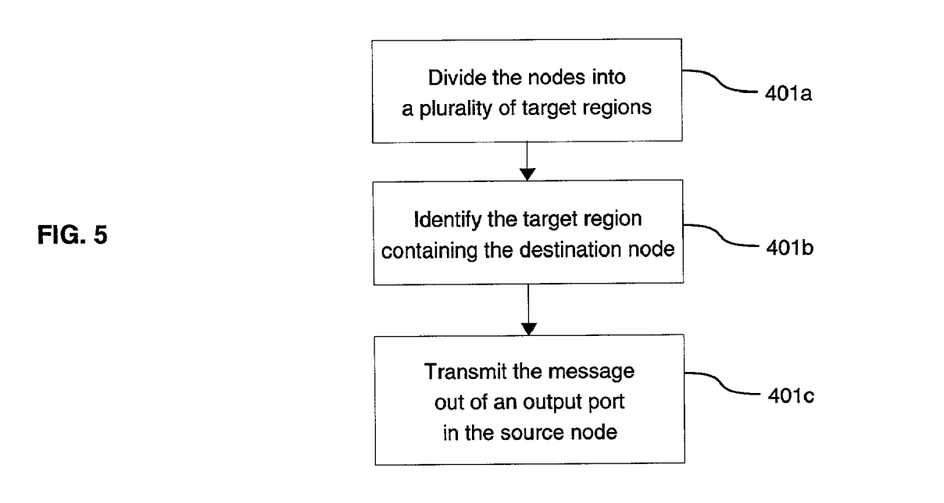

FIG. 5 is a more detailed flowchart of step 401 in accordance with embodiments of the method of FIG. 4. In accordance with these embodiments, the message is initiated at the source node by first dividing the nodes in the array into a plurality of target regions in step 401*a*. Next, in step 401*b*, the source node identifies the target region which contains the destination node. Finally, an output port from the source node is selected and the message is transmitted out of that output port in step 401*c*.

Figure 6:
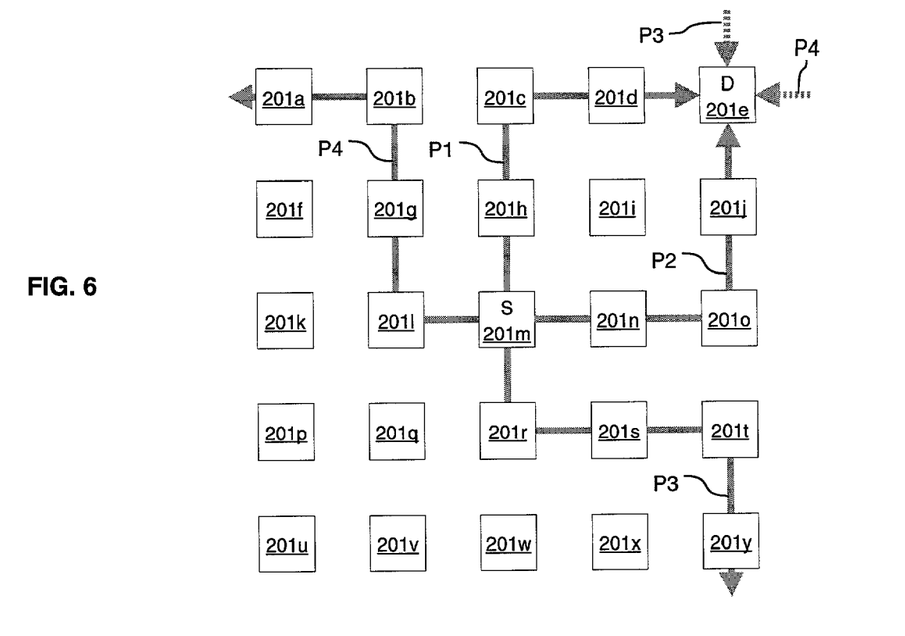
FIGS. 6–7 show functional block diagrams of routing paths in a torus interconnection fabric in accordance with embodiments of the present invention.
Figure 7:
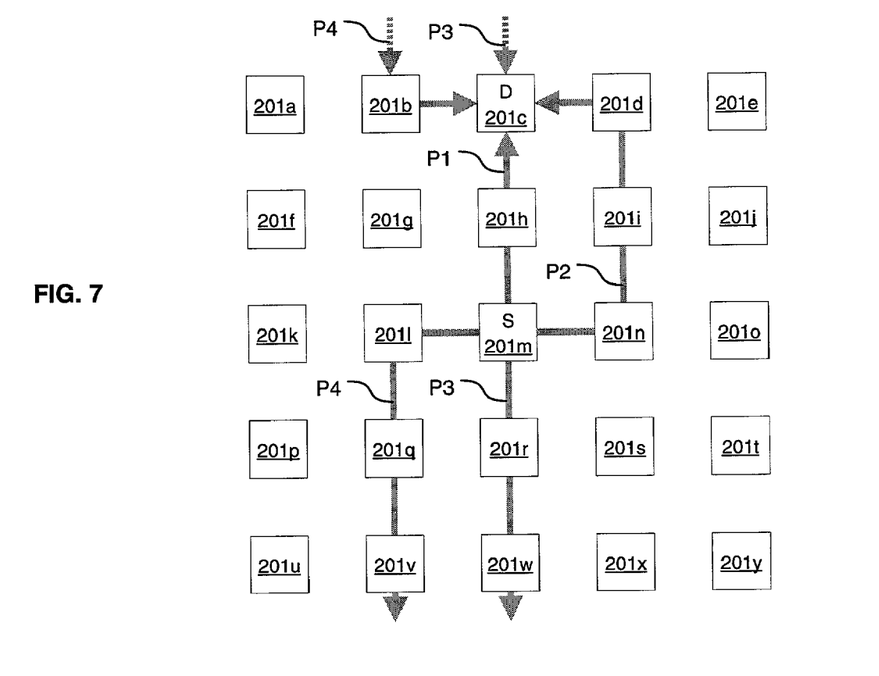

FIGS. 6–7 are block diagrams showing multiple independent routing paths taken by messages in accordance with embodiments of the present invention. FIG. 6 illustrates a case in which the target region for the destination node corresponds to one of the four quadrants. In FIG. 6, node 201*m* is the source node and node 201*e* is the destination node. Accordingly, the destination node lies in target region $Q_{NE}$. For this 5×5 array of nodes 201, when the destination node lies in one of the four quadrants, there exist four fully independent paths for the message to take. Of these four independent paths, two paths can be considered optimal and two paths considered sub-optimal. The optimal paths include the fewest number of nodes through which the message travels to get from the source node to the destination node.

As shown in FIG. 6, paths P1–P2 are the optimal paths and paths P3–P4 are the sub-optimal paths. All paths P1–P4 initiate at source node 201*m* and terminate at destination node 201*e*. Path P1 travels through nodes 201*h*, 201*c*, and 201*d* before reaching destination node 201*e*, path P2 travels through nodes 201*n*, 201*o*, and 201*j*, path P3 travels through nodes 201*r*, 201*s*, 201*t*, and 201*y*, and path P4 travels through nodes 201*l*, 201*g*, 201*b*, and 201*a*. The optimal paths are deemed to be optimal because they pass through the fewest number of nodes to travel from the source to the destination. All four paths are fully independent because the messages transmitted along each path do not pass through any of the same interconnects 104 or nodes 201 while traveling between the source node and the destination node. Therefore, in the event that one of nodes in a first path fails and is unable to transmit the message, the message can be retransmitted along any of the other three paths such that the message will not pass through that same failed node.

For the general situation in which the destination node lies in the target region $Q_{NE}$, the method for determining the four paths can be described in the following manner. To provide a frame of reference, the source node can be defined as having a source node address of $(x_s, y_s)$ and the destination node can be defined as having a destination node address of $(x_d, y_d)$. The x and y axes are defined as $A_X$ and $A_Y$, where the positive direction for the axes is to the north and to the east. The address of an intermediate node along the path is defined as $(x_i, y_i)$. Each node is provided with four ports such that a first port is coupled to a node having coordinates $(x_i, y_i+1)$, a second port is coupled to a node having coordinates $(x_i, y_i-1)$, a third port is coupled to a node having coordinates $(x_i+1, y_i)$, and a fourth port is coupled to a node having coordinates $(x_i-1, y_i)$.

Because the nodes along the edges of the fabric 100 are connected, the coupling between nodes may "wrap around" the endpoints of the coordinate system. Therefore, when $x_i$ equals the minimum value in the x-direction, then $x_i-1$ "wraps around" the edge of the fabric and takes the value of the maximum value in the x-direction. For example, if node 201*u* is assigned the coordinates (0, 0), then node 201*a* will be considered to have the coordinates $(x_i, y_i)=(0, 5)$. In this case, node 201*a*'s port W, which as described above is connected to the node at coordinates $(x_i-1, y_i)$, is coupled to node 201*e*, which has coordinates (5, 5). Similarly, when $x_i$ equals the maximum value in the x-direction, then $x_i+1$ "wraps around" the edge of the fabric and takes the value of the minimum value in the x-direction.

For path P1, the message travels in the positive y-direction until $y_i=y_d$, then the message travels in the positive x-direction until $x_i=x_d$. Then the message is extracted. For path P2, the message travels in the positive x-direction until $x_i=x_d$, then the message travels in the positive y-direction until $y_i=y_d$. Then the message is extracted. For path P3, the message travels one node in the negative y-direction, then travels in the positive x-direction until $x_i=x_d$, then travels in the negative y-direction until $y_i=y_d$. Then the message is extracted. For path P4, the message travels one node in the negative x-direction, then travels in the positive y-direction until $y_i=y_d$, then travels in the negative x-direction until $x_i=x_d$. Then the message is extracted. Similar paths can be defined for situations where the destination node lies in one of the other four quadrants. As described above, these directions are relative and the wrap-around nature of the fabric is considered in routing the message. For example, a message at node 201*a* traveling in the negative x-direction will wrap around the edge of the fabric and be transmitted to node 201*e*.

For situations where the destination node lies on one of the axes $A_X$ and $A_Y$, a different computation can be used to create the four paths. FIG. 7 shows a case in which the destination node 201*c* lies in target region $A_Y$. Path P1 travels through node 201*h* to get from source node 201*m* to destination node 201*c*, path P2 travels through nodes 201*n*, 201*i*, and 201*d*, path P3 travels through nodes 201*r*, and 201*w*, and path P4 travels through 201*l*, 201*g*, 201*v*, and 201*b*.

For the general situation where the destination node is contained in target region $A_Y$, the four independent paths can be described in the following manner. For path P1, the message travels in the positive y-direction until $y_i=y_d$. Then the message is extracted. For path P2, the message travels one node in the positive x-direction, then travels in the positive y-direction until $y_i=y_d$, then travels in the negative x-direction until $x_i=x_d$. Then the message is extracted. For path P3, the message travels in the negative y-direction until $y_i=y_d$. Then the message is extracted. For path P4, the message travels one node in the negative x-direction, then travels in the negative y-direction until $y_i=y_d$, then travels in the positive x-direction until $x_i=x_d$. Then the message is extracted. Similar paths can be defined for situations where the destination node lies in target region $A_X$.

The methodology described above with respect to the paths shown in FIGS. 6–7, is just one methodology for determining the path to a destination node. In other embodiments, the paths can be defined in different ways.

In accordance with embodiments of the present invention, the precise routing path for a message need not be determined by the source node, and, accordingly, the precise routing path need not be encoded within the message itself. Furthermore, each intermediate node is not required to calculate complex routing paths to the destination node as with fully adaptive routing schemes. Instead, the message includes the originating address for the message, the destination address for the message, and a target region for the destination address. When an intermediate node receives the message via one of a plurality of ports provided on the node, the node first determines whether that intermediate node's address corresponds to the destination node. If so, then the message has reached its destination and the intermediate node processes the message. If the destination has not been reached, the intermediate node uses the information provided in the message (i.e., the originating address, the destination address, and the target region) and the location of the receiving port and selects an output port through which the intermediate node transmits the message. A predetermined set of rules for using that information to select the output port can be stored within the node to ensure a consistent and reliable routing of the message from the source to the destination.

Table I below illustrates an algorithm which can be utilized by each intermediate node to determine how to route messages. The instructions for this algorithm can be stored, for example, in routing unit 204, memory 208, or in some other memory accessible by the node.

TABLE I

| | | |
|---|---|---|
| [1] | if ($x_i==x_d$) and ($y_i==y_d$) | [node is destination] |
| | Extract Message | |
| | else if ($Q_{NE}==1$) | [target region is $Q_{NE}$] |
| | if (S==1) | [message from port S] |
| [5] | if ($y_i!=y_d$) | |
| | Use N output port | |
| | else if ($x_i==x_s$) | |
| | Use E output port | [path P1] |
| | else | |
| [10] | Use W output port | [path P4] |
| | end if | |
| | else if (W==1) | [message from port W] |
| | if ($x_i!=x_d$) | |
| | Use E output port | |
| [15] | else if ($y_i==y_s$) | |
| | Use N output port | [path P2] |
| | else | |
| | Use S output port | [path P3] |
| | end if | |
| [20] | else if (E==1) | [message from port E] |
| | if ($y_i!=y_d$) | |
| | Use N output port | [path P4, first step] |
| | else | |
| | Use W output port | [path P4] |
| [25] | end if | |
| | else | [message from port N] |
| | if ($x_i!=x_d$) | |
| | Use E output port | [path P3, 1st step] |
| | else | |
| [30] | Use S output port | [path P3] |
| | end if | |
| | end if | |
| | else if ($Q_{SW}==1$) | [target region is $Q_{SW}$] |
| | if (S==1) | [message from port S] |
| [35] | if ($x_i==x_d$) | |
| | Use W output port | [path P3, 1st step] |
| | else | |
| | Use N output port | [path P3] |
| | end if | |
| [40] | else if (W==1) | [Message from port W] |
| | if ($y_i!=y_d$) | |
| | Use S output port | [path P4, 1st step] |
| | else | |
| | Use E output port | [path P4] |
| [45] | end if | |
| | else if (E==1) | [message from port E] |
| | if ($x_i!=x_d$) | |
| | Use W output port | |
| | else if ($y_i==y_s$) | |
| [50] | Use S output port | [path P2] |
| | else | |
| | Use N output port | [path P3] |
| | end if | |
| | else | [message from port N] |
| [55] | if ($y_i!=y_d$) | |
| | Use S output port | |
| | else if ($x_i==x_s$) | |
| | Use W output port | [path P1] |
| | else | |
| [60] | Use E output port | [path P4] |
| | end if | |
| | end if | |
| | else if ($Q_{NW}==1$) | [target region is $Q_{NW}$] |
| | if (S==1) | [message from port S] |
| [65] | if ($y_i!=y_d$) | |
| | Use N output port | |
| | else if ($x_i==x_s$) | |
| | Use W output port | [path P1] |
| | else | |
| [70] | Use E output port | [path P4] |
| | end if | |
| | else if (W==1) | [message from port W] |
| | if ($y_i!=y_d$) | |
| | Use N output port | [path P4, 1st step] |
| [75] | else | |
| | Use E output port | [path P4] |
| | end if | |
| | else if (E==1) | [message from port E] |
| | if ($x_i!=x_d$) | |
| [80] | Use W output port | |
| | else if ($y_i==y_s$) | |
| | Use N output port | [path P2] |
| | else | |
| | Use S output port | [path P3] |
| [85] | end if | |
| | else | [message from port N] |
| | if ($x_i!=x_d$) | |
| | Use W output port | [path P3, 1st step] |
| | else | |
| [90] | Use S output port | [path P3] |
| | end if | |
| | end if | |
| | else if ($Q_{SE}==1$) | [target region is $Q_{SE}$] |
| | if (S==1) | [message from port S] |
| [95] | if ($y_i!=y_d$) | |
| | Use E output port | [path P3, 1st step] |
| | else | |
| | Use N output port | [path P3] |
| | end if | |
| [100] | else if (W==1) | [message from port W] |
| | if ($x_i!=x_d$) | |
| | Use E output port | |
| | else if ($y_i==y_s$) | |
| | Use S output port | [path P2] |
| [105] | else | |
| | Use N output port | [path P3] |
| | end if | |
| | else if (E==1) | [message from port E] |
| | if ($x_i!=x_d$) | |
| [110] | Use S output port | [path P4, 1st step] |
| | else | |
| | Use W output port | [path P4] |
| | end if | |
| | else [message from port N] | |
| [115] | if ($y_i!=y_d$) | |
| | Use S output port | |
| | else if ($x_i==x_s$) | |
| | Use E output port | [path P1] |
| | else | |
| [120] | Use W output port | [path P4] |
| | end if | |

TABLE I-continued

```
            end if
        else if (A_Y==1)                [target region is A_Y]
            if (S==1)                    [message from port S]
[125]           if (y_i==y_d)
                    Use W output port    [path P2]
                else
                    Use N output port
                end if
[130]       else if (W==1)               [message from port W]
                Use N output port        [path P2]
            else if (E==1)               [message from port E]
                Use S output port        [path P4]
            else [message from port N]
[135]           if (y_i==y_d)
                    Use E output port    [path P4]
                else
                    Use S output port
                end if
[140]       end if
        else if (A_X==1)                 [target region is A_X]
            if (S==1)                    [message from port S]
                Use E output port        [path P1]
            else if (W==1)               message from port W]
[145]           if (x_i==x_d)
                    Use S output port    [path P1]
                else
                    Use E output port
                end if
[150]       else if (E==1)               [message from port E]
                if (x_i==x_d)
                    Use N output port    [path P4]
                else
                    Use W output port
[155]           end if
            else                         [message from port N]
                    Use W output port    [path P3]
            end if
        end if
```

An intermediate node can use the methodology described in Table I as follows. First, the node receives the message and checks whether the destination address matches the node's address (line 1). If the addresses match, then the destination has been reached and the message is extracted (line 2). The message may, for example, include an I/O operation to be performed by a storage device attached to the node. In other situations, the message may be an I/O communication to be transferred out of communication port 210 to a PCI bus. In yet other situations, the message may include cache data to be stored in a cache memory 208.

If the destination address does not match, then the node checks the message to determine what the message's target region is. The target region is determined relative to the source node and can be stored, for example, in a header portion of the message. In Table I, the target region is stored in variables $A_X$, $A_Y$, $Q_{NW}$, $Q_{NE}$, $Q_{SW}$, and $Q_{SE}$, each variable being a one-bit value computed and stored by the source node when the message is initiated. These target region variables are defined to take on the value of "1" if the destination address lies within that target region, or "0" if it does not. In addition, the intermediate node can use the port variables N, S, E, and W to indicate which port received the message. Each port variable is defined to take on the value of "1" if that port is the receiving port, and "0" if it is not. In other embodiments, the target region and receiving port information can be stored in different ways.

Using the arrangement illustrated in FIG. 6, for example, the target region for the message is $Q_{NE}$, so the node then looks to which port received the message (line 3). The intermediate node uses the receiving port information to determine which port to use to output the message. By knowing the target region for the message and by knowing from which direction the message was received, the node can easily determine the appropriate output port for transmitting the message to the next node. The next node will then use the same methodology to determine how to process the message.

Using the methodology described in Table I with the source and destination nodes shown in FIG. 6, the routing will always proceed along one of the four paths P1–P4 and the appropriate output port can be easily determined. For example, if the receiving port is port S (line 4), then the message must be traveling along either P1, P2, or P4. This is because path P3 never transmits the message into the port S of any nodes. If the y-coordinate of the intermediate node ($y_i$) is not equal to the y-coordinate of the destination node ($y_d$), then port N should be selected as the output port (line 6). As can be seen in FIG. 6, the only situation in which receiving port is port S and $y_i$ does not equal $y_d$ is for nodes 201g, 201h, and 201j. For all three of these nodes, the next node would be the node to the north.

If $y_i$ is equal to $y_d$, then the intermediate node should determine whether the x-coordinate of the intermediate node ($x_i$) is not equal to the x-coordinate of the destination node ($x_d$) (line 7). If it is equal, then the appropriate output port is port E (line 8). This corresponds to the determination which would be made by node 201c in FIG. 6. If $x_i$ does not equal $x_d$, the appropriate output port is port W (line 10), which corresponds to the determination made by node 201b.

In the embodiment described above, given a specific source address and a destination address, a source node will have four different output ports for transmitting the message. Each intermediate node has been configured to process incoming messages according to the prescribed algorithm such that transmitting the message out of each of the four output ports on the source node will provide four fully independent paths for routing the message. This methodology can be used by any node in the interconnection fabric to consistently route messages to any of the six target regions.

In an alternative embodiment of the present invention, an intermediate node may use additional variables to assist in the routing of the message. These additional variables may include X and Y, where X is the maximum value of the coordinates in the x-direction and Y is the maximum value of the coordinates in the y-direction. The values of X and Y may be embedded within the message, or may be stored within each node. Table II shows the lines which are changed from the algorithm described above in Table I.

TABLE II

| [21]  | if $(x_i+1==x_s)$ or $((x_i==X)$ and $(x_s==0))$ |
|-------|---------------------------------------------------|
| [26]  | if $(y_i+1==y_s)$ or $((y_i==Y)$ and $(y_s==0))$ |
| [35]  | if $(y_i-1==y_s)$ or $((y_s==Y)$ and $(y_i==0))$ |
| [41]  | if $(x_i-1==x_s)$ or $((x_s==X)$ and $(x_i==0))$ |
| [73]  | if $(x_i-1==x_s)$ or $((x_s==X)$ and $(x_i==0))$ |
| [87]  | if $(y_i+1==y_s)$ or $((y_i==Y)$ and $(y_s==0))$ |
| [95]  | if $(y_i-1==y_s)$ or $((y_s==Y)$ and $(y_i==0))$ |
| [109] | if $(x_i+1==x_s)$ or $((x_i==X)$ and $(x_s==0))$ |

In the embodiment corresponding to Table II, the intermediate node receiving the message will in some cases determine where the intermediate node lies relative to the source node or relative to the maximum value of the fabric (i.e., the "edge" of the fabric) in order to determine the appropriate output port.

The described message routing process and architecture may be implemented as a method, apparatus, or article of manufacture using standard programming and/or engineering techniques to produce software, firmware, hardware, or any combination thereof. In particular, embodiments of the present invention may be implemented in a generalized interconnection by producing the functionality of this fabric in software.

The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which some embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those of ordinary skill in the art will recognize that many modifications may be made to this configuration without departing from the scope of the present invention, and that the article of manufacture may comprise any information bearing medium known in the art.

While the invention has been described in terms of particular embodiments and illustrative figures, those of ordinary skill in the art will recognize that the invention is not limited to the embodiments or figures described. In some embodiments, the paths used by embodiments of this invention need not utilize the exact paths or methodologies described above. Accordingly, the method by which each node selects the appropriate output port can vary and also need not be performed exactly as described above. For example, in FIG. 6, path P4 travels one node to the west, two nodes to the north, and then two nodes to the west again before arriving at the destination node 201e. In other embodiments, path P4 may first travel two nodes to the west, then two nodes to the north, and finally one node to the west again to reach destination node 201e.

In other embodiments, each node may have greater or fewer numbers of ports for receiving and transmitting messages. In addition, although the embodiments described above discuss implementations using a 2D torus interconnection fabric, other variations are possible using other types of interconnection fabrics. For example, multiple layers of 2D fabrics can be connected such that each node can be provided with six interconnects (four as shown in FIG. 1, one connecting to a node directly above and one connecting to a node below). It is understood that while the discussion herein refers to x and y dimensions, various embodiments of the invention can be applied to the z-dimension as well.

Therefore, it should be understood that the invention can be practiced with modification and alteration within the spirit and scope of the appended claims. The description is thus to be regarded as illustrative instead of limiting on the invention.

What is claimed is:

1. A computer-implemented method of routing a message in an interconnection fabric including a plurality of nodes configured in a two-dimensional array, the plurality of nodes comprising a source node, each node having a plurality of ports, said method comprising:

dividing the plurality of nodes into six regions such that each region includes one or more of the plurality of nodes, wherein the six regions comprise:
a first region defined by a first plurality of nodes along a first axis passing through the source node;
a second region defined by a second plurality of nodes along a second axis passing through the source node, the first axis and the second axis dividing the interconnection fabric into four quadrants;
a third region defined by a third plurality of nodes contained within a first of the four quadrants;
a fourth region defined by a fourth plurality of nodes contained within a second of the four quadrants;
a fifth region defined by a fifth plurality of nodes contained within a third of the four quadrants; and
a sixth region defined by a sixth plurality of nodes contained within a fourth of the four quadrants;

receiving a message at a first node via a receiving port provided in the first node, wherein the first node has a first node address and the message includes an originating address for the message, a destination address for the message, and a target region for the destination address; and if the first node address does not correspond to the destination address, then:
determining an output port from the plurality of ports provided in the first node based on the originating address, the destination address, the
first node address, the target region, and the receiving port of the first node; and
transmitting the message to a second node coupled to the determined output port.

2. The method of claim 1, further comprising:
initiating the message at the source node having a source node address, said initiating comprising:
determining the target region based on the destination address and the source node address; and
transmitting the message out of an output port in the source node.

3. The method of claim 2, wherein said determining the target region based on the destination address and the source node address comprises:
identifying the target region as the region containing the node corresponding to the destination address of the message.

4. The method of claim 1, wherein:
each node in the two-dimensional array of nodes has four ports, each port being coupled to another node in the two-dimensional array of nodes.

5. The method of claim 3,
wherein each node has coordinates ($x_i$, $y_i$) and four ports, such that a first port is coupled to a node having coordinates ($x_i$, $y_i+1$), a second port is coupled to a node having coordinates ($x_i$, $y_i-1$), a third port is coupled to a node having coordinates ($x_i+1$, $y_i$), and a fourth port is coupled to a node having coordinates ($x_i-1$, $y_i$);
wherein said dividing the plurality of nodes into the six regions such that each region includes one or more of the plurality of nodes comprises:
orienting the array of nodes such that the source node is provided at approximately a central location in the array of nodes;
defining an x-y coordinate system such that the source node has coordinates ($x_s$, $y_s$), wherein the first axis is defined by the nodes having $y=y_s$ and the second axis is defined by the nodes having $x=x_s$, such that the first and second axes divide the array of nodes into the four quadrants;

forming the six regions in the array of nodes as follows:
the first region comprising the nodes forming the first axis;
the second region comprising the nodes forming the second axis;
the third region comprising the nodes provided in the first of the four quadrants, each of the nodes in the third region having coordinates $x>x_s$ and $y>y_s$;
the fourth region comprising the nodes provided in the second of the four quadrants, each of the nodes in the fourth region having coordinates $x<x_s$ and $y>y_s$;
the fifth region comprising the nodes provided in the third of the four quadrants, each of the nodes in the fifth region having coordinates $x>x_s$ and $y<y_s$; and
the sixth region comprising the nodes provided in the fourth of the four quadrants, each of the nodes in the sixth region having coordinates $x<x_s$ and $y<y_s$; and wherein said identifying the target region as the region containing the node corresponding to the destination address of the message comprises identifying the target region as the region containing the node having coordinates ($x_d$, $y_d$) corresponding to the destination address.

6. The method of claim 1, wherein:
at least one of the plurality of nodes in the interconnection fabric is coupled to a storage device; and
said message includes an I/O transaction to be performed by the storage device.

7. A node for routing a message in an interconnection fabric configured for use in connection with a processor-based system, said node comprising:
a plurality of ports for receiving and transmitting messages, each message including an originating address for the message, destination address for the message, and a target region for the destination address; and
a routing module for determining an output port from the plurality of ports based on the originating address, the destination address, an address of the node, the target region, and the location of the port receiving the message, and for transmitting the message out of the output ports;
wherein the interconnection fabric comprises a two-dimensional array of nodes, wherein the two-dimensional array of nodes is divided into six regions comprising:
a first region defined by a first plurality of nodes along a first axis passing through a source node;
a second region defined by a second plurality of nodes along a second axis passing through the source node, the first axis and the second axis dividing the interconnection fabric into four quadrants;
a third region defined by a third plurality of nodes contained within a first of the four quadrants;
a fourth region defined by a fourth plurality of nodes contained within a second of the four quadrants;
a fifth region defined by a fifth plurality of nodes contained within a third of the four quadrants; and
a sixth region defined by a sixth plurality of nodes contained within a fourth of the four quadrants.

8. The node of claim 7, wherein:
said plurality of ports comprises four ports, each port being coupled to another node in a two-dimensional array of nodes.

9. The node of claim 7, further comprising:
a storage device, wherein the message includes an I/O transaction to be performed by the storage device.

10. A computer system, comprising:
an interconnection fabric, comprising:
a plurality of nodes configured in a two-dimensional array, each node comprising:
a plurality of ports for receiving and transmitting messages, each message including an originating address for the message, destination address for the message, and a target region for the destination address; and
a routing module for determining an output port from the plurality of ports based on the originating address, the destination address, an address of the node, the target region, and the location of the port receiving the message, and for transmitting the message out of the output port;
wherein the plurality of nodes are divided into six regions comprising:
a first region defined by a first plurality of nodes along a first axis passing through a source node;
a second region defined by a second plurality of nodes along a second axis passing through the source node, the first axis and the second axis dividing the interconnection fabric into four quadrants;
a third region defined by a third plurality of nodes contained within a first of the four quadrants;
a fourth region defined by a fourth plurality of nodes contained within a second of the four quadrants;
a fifth region defined by a fifth plurality of nodes contained within a third of the four quadrants; and
a sixth region defined by a sixth plurality of nodes contained within a fourth of the four quadrants; and
a plurality of node interconnects, each node interconnect coupling one of the plurality of ports in one of the plurality of nodes to one of the plurality of ports in a different one of the plurality of nodes.

11. The computer system of claim 10,
wherein the source node comprises a source node address, said source node configured to initiate the message by:
determining the target region based on the destination address and the source node address; and
transmitting the message out of an output port in the source node.

12. The computer system of claim 11, wherein said source node is configured to determine the target region based on the destination address and the source node address by:
dividing the plurality of nodes into the six regions such that each region includes one or more of the plurality of nodes; and
identifying the target region as the region containing the node corresponding to the destination address of the message.

13. The computer system of claim 10, wherein:
each node in the two-dimensional array of nodes has four ports, each port being coupled to another node in the two-dimensional array of nodes.

14. The computer system of claim 12,
wherein each node has coordinates ($x_i$, $y_i$) and four ports, such that a first port is coupled to a node having coordinates ($x_i$, $y_{i+1}$), a second port is coupled to a node having coordinates ($x_i$, $y_{i-1}$), a third port is coupled to a node having coordinates ($x_{i+1}$, $y_i$), and a fourth port is coupled to a node having coordinates ($x_{i-1}$, $y_i$);

wherein said source node is configured to divide the plurality of nodes into a the six regions such that each region includes one or more of the plurality of nodes by:
orienting the array of nodes such that the source node is provided at approximately a central location in the array of nodes;
defining an x-y coordinate system such that the source node has coordinates ($x_s$, $y_s$), wherein the first axis is defined by the nodes having $y=y_s$ and the second axis is defined by the nodes having $x=x_s$, such that the first and second axes divide the array of nodes into the four quadrants;
forming the six regions in the array of nodes as follows:
the first region comprising the nodes forming the first axis;
the second region comprising the nodes forming the second axis;
the third region comprising the nodes provided in the first of the four quadrants, each of the nodes in the third region having coordinates $x>x_s$ and $y>y_s$;
the fourth region comprising the nodes provided in the second of the four quadrants, each of the nodes in the fourth region having coordinates $x<x_s$ and $y>y_s$;
the fifth region comprising the nodes provided in the third of the four quadrants, each of the nodes in the fifth region having coordinates $x>x_s$ and $y<y_s$; and
the sixth region comprising the nodes provided in the fourth of the four quadrants, each of the nodes in the sixth region having coordinates $x<x_s$ and $y<y_s$; and
wherein said source node is configured to identify the target region as the region containing the node corresponding to the destination address of the message by identifying the target region as the region containing the node having coordinates ($x_d$, $y_d$) corresponding to the destination address.

15. The computer system of claim 10, further comprising:
a plurality of storage devices, each storage device being provided at one of the plurality of nodes; and
said message includes an I/O transaction to be performed by one of the plurality of storage devices.

16. An article of manufacture including code for routing a message in an interconnection fabric including a plurality of nodes configured in a two-dimensional array, the plurality of nodes comprising a source node, each node having a plurality of ports, wherein the code causes operations to be performed comprising:
dividing the plurality of nodes into six regions such that each region includes one or more of the plurality of nodes, wherein the six regions comprise:
a first region defined by a first plurality of nodes along a first axis passing through the source node;
a second region defined by a second plurality of nodes along a second axis passing through the source node, the first axis and the second axis dividing the interconnection fabric into four quadrants;
a third region defined by a third plurality of nodes contained within a first of the four quadrants;
a fourth region defined by a fourth plurality of nodes contained within a second of the four quadrants;
a fifth region defined by a fifth plurality of nodes contained within a third of the four quadrants; and
a sixth region defined by a sixth plurality of nodes contained within a fourth of the four quadrants;
receiving a message at a first node via a receiving port provided in the first node, wherein the first node has a first node address and the message includes an originating address for the message, a destination address for the message, and a target region for the destination address; and
if the first node address does not correspond to the destination address, then:
determining an output port from the plurality of ports provided in the first node based on the originating address, the destination address, the first node address, the target region, and the receiving port of the first node; and
transmitting the message to a second node coupled to the determined output port.

17. The article of manufacture of claim 16, further comprising:
initiating the message at the source node having a source node address, said initiating comprising:
determining the target region based on the destination address and the source node address; and
transmitting the message out of an output port in the source node.

18. The article of manufacture of claim 17, wherein said determining the target region based on the destination address and the source node address comprises:
identifying the target region as the region containing the node corresponding to the destination address of the message.

19. The article of manufacture of claim 16, wherein:
each node in the two-dimensional array of nodes has four ports, each port being coupled to another node in the two-dimensional array of nodes.

20. The article of manufacture of claim 18,
wherein each node has coordinates ($x_i$, $y_i$) and four ports, such that a first port is coupled to a node having coordinates ($x_i$, $y_{i+1}$), a second port is coupled to a node having coordinates ($x_i$, $y_{i-1}$), a third port is coupled to a node having coordinates ($x_{i+1}$, $y_i$), and a fourth port is coupled to a node having coordinates ($x_{i-1}$, $y_i$);
wherein said dividing the plurality of nodes into the six regions such that each region includes one or more of the plurality of nodes comprises:
orienting the array of nodes such that the source node is provided at approximately a central location in the array of nodes;
defining an x-y coordinate system such that the source node has coordinates ($x_s$, $y_s$), wherein the first axis is defined by the nodes having $y=y_s$ and the second axis is defined by the nodes having $x=x_s$, such that the first and second axes divide the array of nodes into the four quadrants;
forming the six regions in the array of nodes as follows:
the first region comprising the nodes forming the first axis;

the second region comprising the nodes forming the second axis;

the third region comprising the nodes provided in the first of the four quadrants, each of the nodes in the third region having coordinates $x>x_s$ and $y>y_s$;

the fourth region comprising the nodes provided in the second of the four quadrants, each of the nodes in the fourth region having coordinates $x<x_s$ and $y>y_s$;

the fifth region comprising the nodes provided in the third of the four quadrants, each of the nodes in the fifth region having coordinates $x>x_s$ and $y<y_s$; and the sixth region comprising the nodes provided in the fourth of the four quadrants, each of the nodes in the sixth region having coordinates $x<x_s$ and $y<y_s$; and wherein said identifying the target region as the region containing the node corresponding to the destination address of the message comprises identifying the target region as the region containing the node having coordinates $(x_d, y_d)$ corresponding to the destination address.

21. The article of manufacture of claim 16, wherein:

at least one of the plurality of nodes in the interconnection fabric is coupled to a storage device; and said message includes an I/O transaction to be performed by the storage device.

\* \* \* \* \*